US012664476B2

(12) United States Patent
Sheth et al.

(10) Patent No.: US 12,664,476 B2
(45) Date of Patent: Jun. 23, 2026

(54) HALLUCINATION PREVENTION FOR LARGE LANGUAGE MODELS

(71) Applicant: Team5, Inc., Northville, MI (US)

(72) Inventors: Tushar Sheth, Northville, MI (US); Jordan Cole, Shreveport, LA (US); Rahul Gupta, Westport, CT (US); Ryan Mcwhorter, Austin, TX (US)

(73) Assignee: Team5, Inc., Northville, MI (US)

( * ) Notice: Subject to any disclaimer, the term of this patent is extended or adjusted under 35 U.S.C. 154(b) by 564 days.

(21) Appl. No.: 18/312,518

(22) Filed: May 4, 2023

(65) Prior Publication Data

US 2024/0370769 A1     Nov. 7, 2024

(51) Int. Cl.
*G06N 20/00* (2019.01)
*G06F 16/242* (2019.01)

(52) U.S. Cl.
CPC ........... *G06N 20/00* (2019.01); *G06F 16/243* (2019.01)

(58) Field of Classification Search
CPC .............................. G06N 20/00; G06F 16/243
USPC .......................................................... 706/12
See application file for complete search history.

(56) References Cited

U.S. PATENT DOCUMENTS 10,055,470 B1 * 8/2018 Manzo .................. G06F 16/256
2020/0167691 A1 5/2020 Golovin et al.

* cited by examiner

*Primary Examiner* — Sherrod L Keaton
(74) *Attorney, Agent, or Firm* — Perkins Coie LLP

(57) ABSTRACT

Methods and systems are disclosed herein for preventing hallucinations in machine learning models by enabling query responses based on a predefined ground truth defined by a corpus of information. The system may use multiple machine learning models. In particular, the system may receive a user query and use a machine learning model to split the user query into multiple sub-queries that would ask component questions for the query. The component questions may then be used to get accurate information for responding to the query. Once the information is identified, the hallucination prevention system may input that information into another machine learning model (for example, a large language model) with instructions to deliver the response to the query based on the identified information, but put it into a specific, desired form. In some embodiments, another machine learning model may be used to identify undesired responses based on policy and/or other requirements.

20 Claims, 7 Drawing Sheets

*700*

Receive a query
702

Generate, based on the query, a plurality of sub-queries
704

Input, into a specialized language model, the plurality of sub-queries to obtain a plurality of accurate responses to the plurality of sub-queries
706

Receive from the specialized language model, a plurality of responses to the plurality of sub-queries
708

Generate and input an engineered prompt into a large language model
710

Input the response into a sentinel machine learning model to generate a modified response
712

Provide the modified response responsive to the query
714

| Query | How did tech industry stocks performed last year? |
|-------|---------------------------------------------------|
| Sub-query_1 | What year was last year? |
| Sub-query_2 | What stocks are tech industry stocks? |
| Sub-query_3 | What determines stock performance? |
| Sub-query_4 | What were the values of industry stocks at different points of last year? |

300

302

304

306

308

310

312

314

| Additional Prompt Vectors | Portion |
|---|---|
| Vector_1 | Portion_1 |
| Vector_2 | Portion_1 |
| Vector_3 | Portion_2 |
| Vector_4 | Portion_3 |

HALLUCINATION PREVENTION FOR LARGE LANGUAGE MODELS

BACKGROUND

In recent years, use of machine learning technologies has been growing exponentially. Machine learning models are now used in many technology areas including computer vision, network monitoring, autonomous driving, and others. One specific field where machine learning technologies have excelled recently is large language modeling, where a machine learning model (e.g., a large language model) is trained to communicate with a user in a human-like manner, thereby simulating human-to-human interaction. Those models are generally trained to generate representations of a probability distribution over words that are seen in a training corpus. That is, the model is attempting to produce distributions of text which are consistent with what the model has already seen in the training corpus. Thus, these models typically produce language that corresponds to a plausible response, but not necessarily a correct response. This is generally referred to as model hallucination. Model hallucination may be particularly difficult to address because the answer given by the model is delivered in a package that has the look and feel of an appropriate response. However, the facts themselves may or may not be correct or accurate. That is, hallucinations may be difficult to identify because the response sounds coherent and meaningful even when incorrect. Furthermore, hallucinations are difficult to address because it is difficult to precisely decipher what caused the neural net to produce a particular set of words in a given instance.

SUMMARY

Accordingly, methods and systems are disclosed herein for preventing hallucinations in machine learning models by forcing a model to answer questions/queries based on a predefined ground truth defined by a corpus of information (which may be thought of as an attached memory module) used to identify correct information response to the question/query. Such a system may be referred to as a hallucination prevention system. The hallucination prevention system may use multiple machine learning models (e.g., a large language model in combination with one or more specialized models) to prevent hallucinations. In particular, the hallucination prevention system may receive a user query (e.g., a question from a user) and use a machine learning model (e.g., a large language model or a specialized model) to split the user query into multiple sub-queries that would ask component questions for the query. The component questions may then be used to get accurate information (e.g., from a specialized machine learning model) for responding to the query. Once the information is identified, the hallucination prevention system may input that information into another machine learning model (e.g., the large language model) with instructions to deliver the response to the query based on the identified information, but put it into a specific, desired form. In some embodiments, another machine learning model (e.g., a sentinel model) may be used to identify undesired responses based on policy and/or other requirements.

The above-described mechanism may function according to the following operations. The hallucination prevention system may receive a user query. The user query may be a question from a user that includes a number of words and/or phrases. The query may be typed, spoken, or otherwise received by the hallucination prevention system. For example, a user may ask: "How did Apple's stock perform last year?"

The hallucination prevention system may generate, based on the user query, a plurality of sub-queries using a query building model. Each query of the plurality of sub-queries may represent a component of the user query. The query building model may be a large language model or another suitable model which may be trained to generate sub-queries. To continue with the example above, if the user query was "How did Apple's stock perform last year," the hallucination prevention system may split that query into multiple questions. For example, one question/sub-query may be "what year was last year." Another question/sub-query may be "what financial information is required to ascertain performance of a stock?" Yet another question/sub-query may be (e.g., if the current year is 2023), "apple stock data 2022". Other questions/sub-queries may be generated accordingly.

The hallucination prevention system may input, into a specialized language model, the plurality of sub-queries to obtain a plurality of accurate responses to the plurality of sub-queries. In some embodiments, each sub-query may be mapped (e.g., vectorized) into a vector space of the specialized language model. For example, the specialized language model may have been trained to identify vectors that match vectors of sub-queries and or questions received by the specialized language model. The matching vectors may then be used to identify the corresponding response to the question/sub-query within a corpus of information. The specialized language model may have access to an attached memory module or database which contains pre-specified factual information. The vectorized version of the question/sub-query may be used to extract the most relevant information from the memory module.

Thus, the hallucination prevention system may receive from the specialized language model, a plurality of responses to the plurality of sub-queries. As discussed above, the specialized language model matches a corresponding vector of each sub-query with a vector of an output generated based on training data. To continue with the example above, the responses may include a response to "what year was last year" (e.g., 2022). Another response may be a response to "what financial information is required to ascertain performance of a stock" (daily price, volume, market cap, etc.). Yet another response may be a response to the query "apple stock data 2022" (e.g., may include some type of stock chart for year 2022, depending on the corpus of data available. Other responses may be generated accordingly. The corpus here may be an attached memory module or database, to which the specialized language models have direct access.

The hallucination prevention system may then generate an engineered prompt for a machine learning model (e.g., a large language model). The engineered prompt may include (1) the plurality of responses and (2) one or more instructions for the large language model to generate a response based on the plurality of responses to sub-queries. For example, the engineered prompt may instruct the large language model to draft well-formatted responses using the "facts" provided by the specialized language model. The hallucination prevention system may then input the engineered prompt into the large language model to generate the response based on the "facts" it is supplied.

Once the hallucination detection system receives a response from the large language model (or another suitable model), the hallucination detection system may input the response into a sentinel machine learning model to generate a modified response. The sentinel machine learning model may be trained to identify undesired components of the response. For example, the sentinel machine learning model may be trained on phrases/sentences/paragraphs to identify language that is undesired in a response. For example, discriminatory language, vulgar language, etc. Thus, the sentinel machine learning model may be trained with any language that is undesired. The language may be recognized and removed from the response.

In some embodiments, the sentinel machine learning model may be used to error check/correct the response. For example, the sentinel machine learning model may split the response (e.g., by sentence/phrase/paragraph) into portions and then generate vectors for each portion. The vectors may be compared to vectors generated for portions of the corpus (i.e., the ground truth stored in an attached memory module or database) of information. Each portion that has a vector that matches a vector of the corpus may be confirmed as a valid answer (e.g., the information exists in the corpus). However, if any vectors do not match, the corresponding portion of the response may be fed back into the large language model to be reformulated. The hallucination system may generate a modified response based on the reformulation and provide the modified response responsive to the user query.

Various other aspects, features and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data), unless the context clearly dictates otherwise.

BRIEF DESCRIPTION OF THE DRAWINGS

FIG. 5 illustrates an excerpt of a data structure that stores vectors for additional prompts and corresponding portions, in accordance with one or more embodiments of this disclosure.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
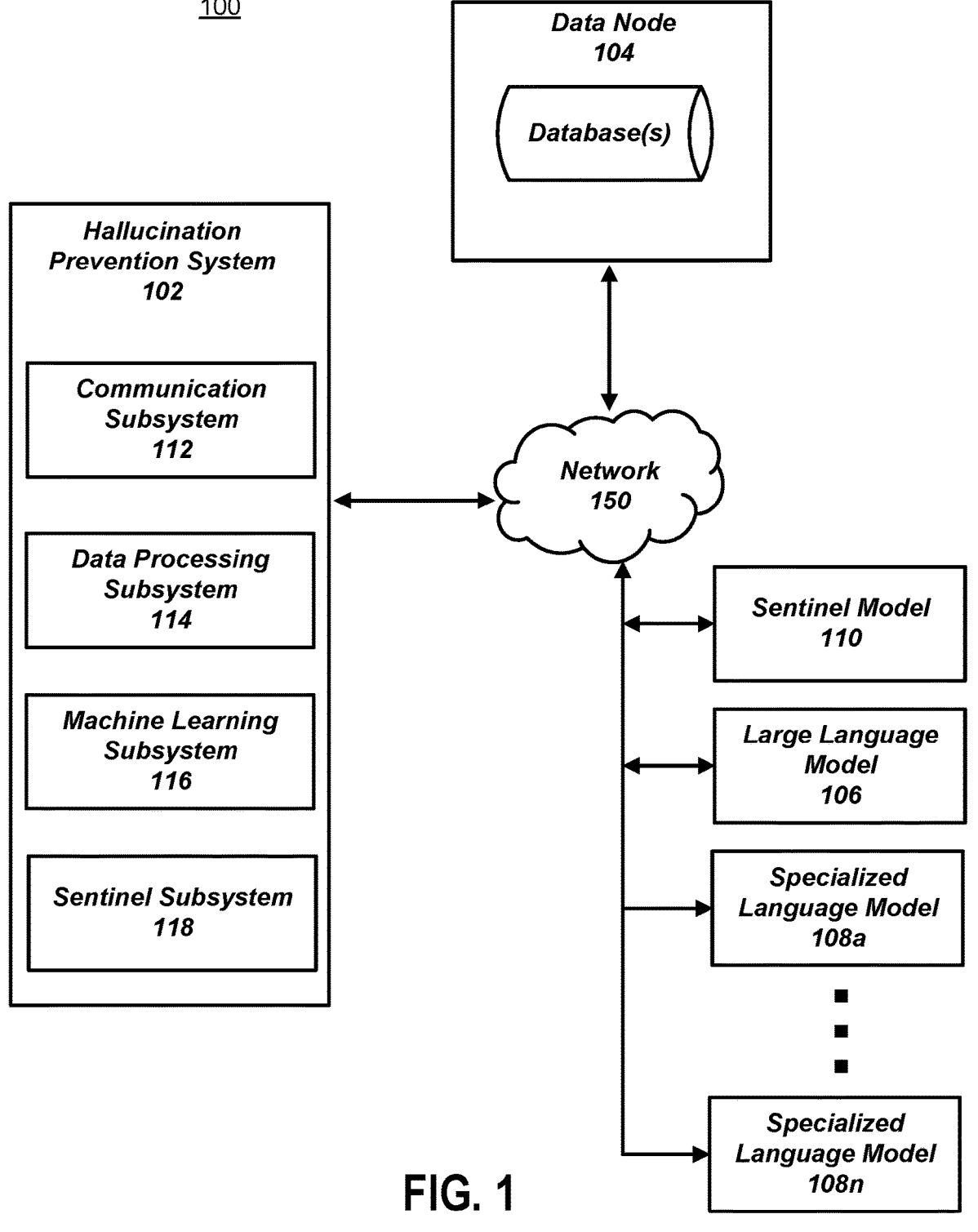
FIG. 1 illustrates a system for preventing hallucinations in large language models, in accordance with one or more embodiments of this disclosure.

FIG. 1 illustrates environment 100 for preventing hallucinations in large language models or other machine learning models when responding to queries/questions. Environment 100 includes hallucination prevention system 102, data node 104, large language model 106 and specialized language models 108a-108n. Hallucination prevention system 102 may execute instructions for preventing hallucinations in machine learning models, and may include software, hardware or a combination of the two. For example, hallucination prevention system 102 may be hosted on a physical server or a virtual server that is running on a physical computer system.

Data node 104 may store various data, including various machine learning models, training and other datasets, and other data required by the hallucination prevention system 102. In some embodiments, data node 104 may store a database that includes a corpus of information to be used in conjunction with a particular machine learning model (e.g., a specialized language model). The corpus of information may be broken up into portions and each portion may be stored in associated with a plurality of vector corresponding to queries/questions that the portion may answer.

In some embodiments, data node 104 may also be used to train machine learning models. For example, data node 104 may be used to train, different specialized language models. Although specialized language models 108a-108n are shown as separate from data node 104, in some embodiments, data node 104 may host those models. Data node 104 may include software, hardware, or a combination of the two. For example, data node 104 may be a physical server, or a virtual server that is running on a physical computer system. Network 150 may be a local area network, a wide area network (e.g., the Internet), or a combination of the two. Specialized language models 108a-108n may be machine learning models trained based on specific information (e.g., each specialized language model may be trained based on a different corpus/set of information).

Hallucination prevention system 102 may include communication subsystem 112. Communication subsystem 112 may include software components, hardware components, or a combination of both. For example, communication subsystem 112 may include a network card (e.g., a wireless network card and/or a wired network card) that is coupled with software to drive the card. Hallucination prevention system 102 may also include data processing subsystem 114. Data processing subsystem 114 may include software components, hardware components, or a combination of both. Data processing subsystem 114 may perform data operations in preparation for machine learning model interaction.

In addition, hallucination prevention system 102 may include machine learning subsystem 116. Machine learning subsystem 116 may include software components, hardware components, or a combination of both. Machine learning subsystem 116 may perform various operations that require interaction with machine learning models (e.g., large language models, specialized language models, etc.). Hallucination prevention system 102 may also include sentinel subsystem 118. Sentinel subsystem 118 may include software components, hardware components, or a combination of both. In some embodiments, sentinel subsystem 118 may perform detection of undesired responses or parts of response that are undesired. For example, sentinel subsystem 118 may communicate with sentinel model 110 to submit response to determine whether any portion of the response is undesired.

Figure 2:
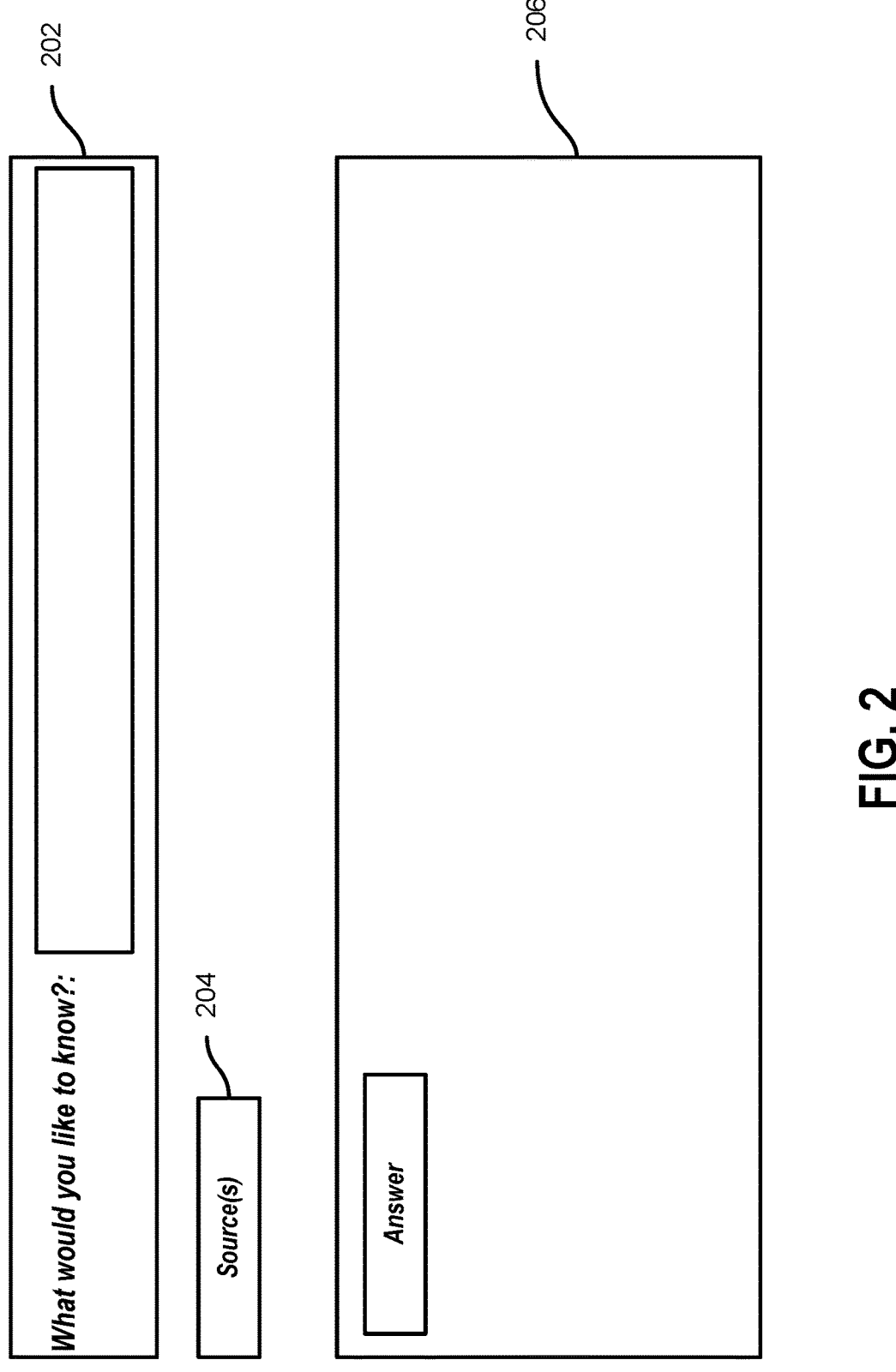
FIG. 2 illustrates an interface that may be used to receive a query from a user, in accordance with one or more embodiments of this disclosure.

Thus, the disclosed mechanism for preventing hallucinations in machine learning models (e.g., large language models) uses a multi-machine learning model approach. Hallucination prevention system 102 may receive a user query. The user query may include a plurality of words. Those words may be in the form of sentences, paragraphs, phrases, and/or other suitable form. FIG. 2 illustrates an interface that may be used to receive a query from a user. User interface 200 may include a field 202 for entering a query/question or phrase. Selector 204 may enable a user to select a source (e.g., an information corpus) that the user may want to use. For example, a securities corpus, a textbook corpus or another suitable corpus. Each corpus may have a corresponding machine learning model (e.g., a specialized language model) that may return an answer. In some embodiments, the user may select multiple sources. In yet some embodiments, hallucination prevention system 102 may select a source automatically based on the question/query from the user. Area 206 may display an answer to the query/question.

In some embodiments, the query may be received from another computing system and not from a user. For example, a computing system may transmit the query/question to hallucination prevention system 102. When communication subsystem 112 receives the query, communication subsystem 112 may pass the query/question to data processing subsystem 114.

Data processing subsystem 114 may generate, based on the user query, a plurality of sub-queries. In some embodiments, data processing subsystem 114 may generate the sub-queries using a query building model. Furthermore, each query of the plurality of sub-queries may represent a component of the user query. For example, data processing subsystem 114 may use one of the specialized language models 108a-108n to perform this operation. That is, a query building model may be one of the specialized language models. In some embodiments, a particular specialized language model may be trained to generate sub-queries based on the query.

To generate the sub-queries, data processing subsystem 114 may generate a prompt for the query building model. The prompt may include text of the user query and one or more instructions to generate component queries for the user query. Data processing subsystem 114 may input the prompt into the query building model, and receive, from the query building model the plurality of sub-queries. In some embodiments, data processing subsystem 114 may use machine learning subsystem 116 to perform the input operations into various machine learning models. For example, a training routine for a specialized machine learning model (e.g., query building model) may take, as input, a query/question and also a plurality of sub-queries/sub-questions for each query. The training routine may generate embedding vectors for all queries/questions and sub-queries/sub-questions. The training routine may then train the model to identify when an embedding vector for query/question matches an embedding vector for a sub-query/sub-question. Accordingly, the query building model (e.g., a specialized language model) may take a query/question as an input and output a plurality of sub-queries/sub-questions.

In some embodiments, data processing subsystem 114 may cause generation of the sub-queries/sub-questions on the fly. For example, data processing subsystem 114 may use another model (e.g., a large language model 106 or a specialized language model of specialized language models 108a-108n) as the query building model with on-the-fly processing. In particular, data processing subsystem 114 may receive or generate an exemplar query and a plurality of exemplar sub-queries. For example, data node 104 and a specialized language model of specialized language models 108a-108n may store and/or generate various questions and corresponding component questions. Data processing subsystem 114 may retrieve one or more of those sets of questions and component questions. For example, if a question asks, "was hockey popular this season," component questions may include questions such as, "what are the dates associated with this hockey season," "what was attendance at hockey games this season," "what was television viewership of hockey games over a number of seasons."

Data processing subsystem 114 may add to the prompt the exemplar query together with the example question and example component/sub-questions. Thus, data processing subsystem 114 may submit the exemplar query and the plurality of exemplar sub-queries into the query building model with an indication that the exemplar query and the plurality of exemplar sub-queries to be used as an example for outputting the plurality of sub-queries. Thus, the query building model may process information on the fly based on the submitted example and output the sub-queries/sub-questions based on that training. Examples of exemplar queries and exemplar sub-queries are a form of "prompt engineering" that may cause the specialized models 108a-108n to extract highly relevant information from data corpus 104 that is later submitted to large language model 106. The latter generates the proposed response to the original query.

In some embodiments, data processing subsystem 114 may perform the following operations when using a large language model to generate sub-queries. Data processing subsystem 114 may retrieve an exemplar query and a plurality of exemplar sub-queries. The exemplar query may be a question that is to be answered by the large language model. The plurality of exemplar sub-queries may be component questions of the exemplar query that are to be answered by the large language model. The component questions may be questions that help retrieve or otherwise obtain accurate information for the original query.

Data processing subsystem 114 may then generate a prompt (e.g., for the large language model 106 or another suitable model). The prompt may include (1) text of the query, (2) the exemplar query with the plurality of exemplar sub-queries, and (3) a command to generate the plurality of the sub-queries for the query. As discussed above, the instructions may include an indication that the exemplar query and the plurality of exemplar sub-queries are to be used as an example (prompt engineering) for outputting the plurality of sub-queries. Data processing subsystem 114 may then input (e.g., via machine learning subsystem 116) the prompt into the large language model, and receive, from the large language model the plurality of sub-queries.

Figure 3:
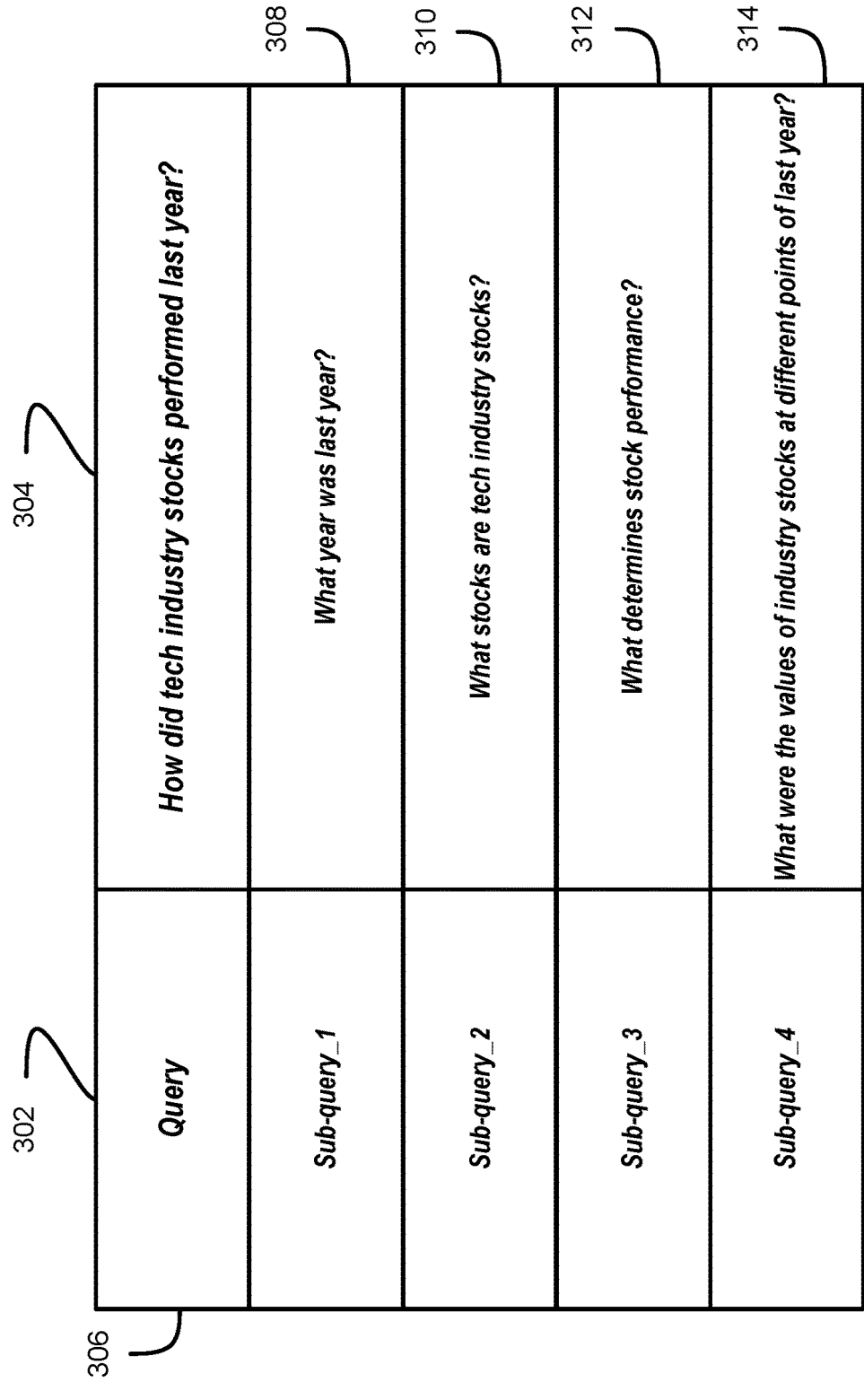
FIG. 3 illustrates a data structure for received sub-queries in combination with the original query, in accordance with one or more embodiments of this disclosure.

FIG. 3 illustrates a data structure for received sub-queries in combination with the original query. FIG. 3 may include data structure 300 with column 302 storing name fields and column 304 storing value fields. Name-value pair 306 may include the original query while name-value pairs 308, 310, 312, and 314 illustrate various possible sub-queries for the original query.

When the sub-queries have been generated, those sub-queries may be used to obtain an accurate response to the original query (e.g., a question from the user). Thus, data processing subsystem 114 may pass the sub-queries to machine learning subsystem 116. Machine learning subsystem 116 may input, into a specialized language model, the plurality of sub-queries to obtain a plurality of accurate responses to the plurality of sub-queries. In some embodiments, the specialized machine learning model may map each sub-query into a vector space of the specialized language model. A specialized model of specialized models 108a-108n may extract specific facts or information from, for example, data node 104 in response to queries and sub-queries. This information is included in the engineered prompt sent to the large language model 106 which has the primary responsibility of generating the language of the proposed response. Large language model 106 may perform the primary language generation function. The specialized language models 108a-108n, another instance of the large model 106, and/or the data node 104 may perform a function similar to "memory" in the brain: each may break up the original input query into sub-queries, find answers to these queries, and submit an engineered prompt with this information to the large model 106 in order to generate a proposed response.

Figure 4:
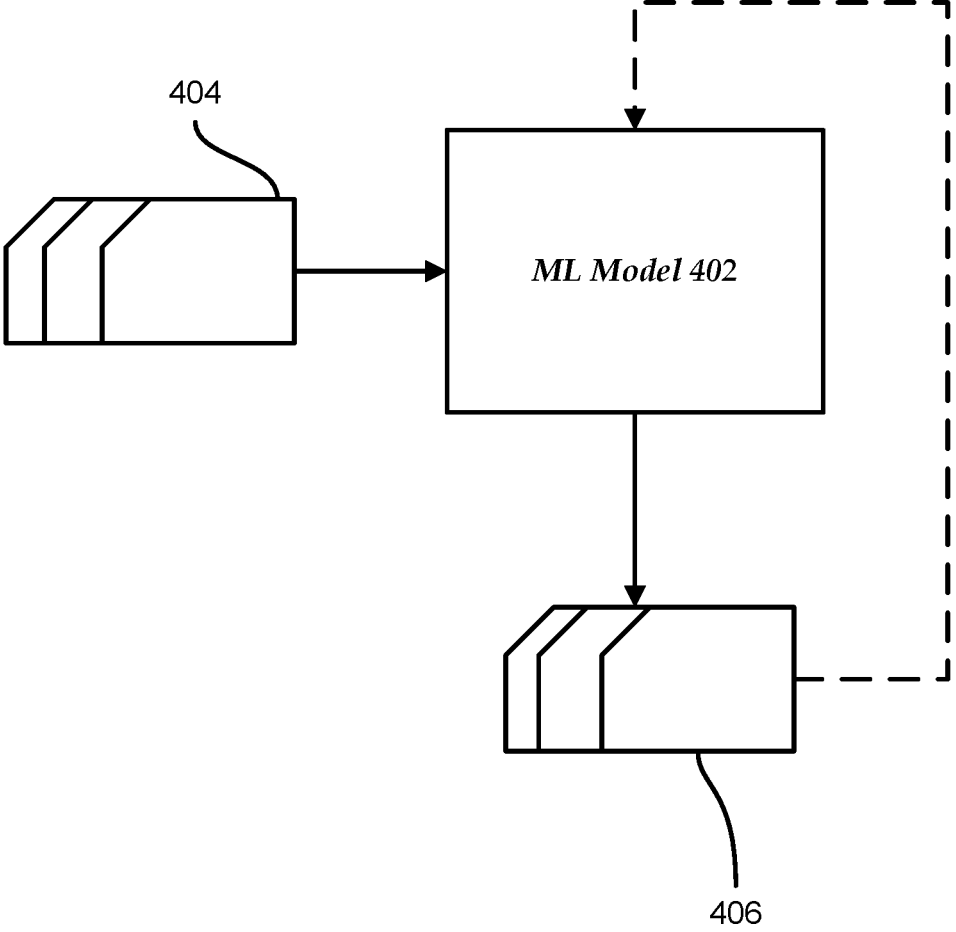
FIG. 4 illustrates an exemplary machine learning model, in accordance with some embodiments of this disclosure.

FIG. 4 illustrates an exemplary machine learning model. The exemplary machine learning model may be trained to function as a specialized language model, a large language model, and/or a query building model. Machine learning model 402 may take input 404 (e.g., a vector representation of textual data) and may generate output parameters 406 which may be different outputs depending on the type of model. For example, if the exemplary machine learning model is a query building model, output parameters 406 may be sub-queries.

The output parameters 406 may be fed back to the machine learning model as input to train the machine learning model (e.g., alone or in conjunction with user indications of the accuracy of outputs, labels associated with the inputs, or with other reference feedback information). The machine learning model may update its configurations (e.g., weights, biases, or other parameters) based on the assessment of its prediction (e.g., of an information source), and reference feedback information (e.g., user indication of accuracy, reference labels, or other information). Connection weights may be adjusted, for example, if the machine learning model is a neural network, to reconcile differences between the neural network's prediction and the reference feedback. One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions of information sources that are responsive to a query.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function which combines the values of all of its inputs together. Each connection (or the neural unit itself) may have a threshold function that a signal must surpass before it propagates to other neural units. The machine learning model may be self-learning and/or trained rather than explicitly programmed, and may perform significantly better in certain areas of problem solving, as compared to computer programs that do not use machine learning. During training, an output layer of the machine learning model may correspond to a classification of machine learning model, and an input known to correspond to that classification may be input into an input layer of the machine learning model during training. During testing, an input without a known classification may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector.

The machine learning model may be structured as a factorization machine model. The machine learning model may be a non-linear model and/or supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on the graph and/or vector.

Each specialized machine learning model may be unique in that it is trained based on a specific corpus of information. This enables an accurate response to the query (e.g., via sub-queries generated as described above). To train a particular specialized model, machine learning subsystem 116 may receive a corpus of information for training a machine learning model. The corpus of information may be, for example, books related to a specific topic. Some other examples for a corpus of information may include, financial statements, medical journals, etc. In some embodiments, the corpus of information may be stored on data node 104 or at another suitable location.

Machine learning subsystem 116 may split the corpus of information (training data) into a plurality of portions. For example, if the corpus of data includes textbooks, each portion may be a chapter, sub-chapter, or another suitable portion. In particular, the textbooks may be obtained in (or converted into) digital versions and chapter and sub-chapter boundaries may be determined by machine learning subsystem 116. In another example, each portion may be a particular financial statement that may be obtained in a digital version. The portions may be stored in data node 104 as corpus memory so the data may be retrieved when searched. In some embodiments, the portions may be generated using a natural language processing algorithm (e.g., Natural Language Toolkit in Python). For example, the corpus may be split into fifteen to twenty sentence chunks.

Machine learning subsystem 116 may input each portion of the plurality of portions into a large language model (or another suitable model) to obtain a corresponding set of prompts for each portion of the plurality of portions. Each portion may be used to respond to the corresponding set of prompts. For example, the large language model or another suitable model may be trained to take, as input, a phrase/paragraph/chapter or another suitable portion of text and generate, based on the portion of text, a plurality of queries/questions that the portion of text would be a response to. For example, a portion of text may discuss a particular medical concept (e.g., a particular illness). Accordingly, the question that the portion of text may answer is "what are the symptoms of the illness," or "describe the illness". In some embodiments, instead of the large language model (e.g., large language model 106), generating queries/questions that can be answered by each portion of the information corpus, a specialized model (e.g., of specialized models 108*a*-108*n* may be used for this purpose).

Machine learning subsystem 116 may then train the specialized language model based on the plurality of portions and each corresponding set of prompts. For example, machine learning subsystem may use the training routine of a particular specialized model to vectorize each portion and the corresponding set of prompts/questions into the same vector space. Machine learning subsystem 116 may then train the model where the corresponding vectors of the prompts/questions match certain portions (e.g., vectors associated with those portions), while other prompts/questions do not match other portions.

In some embodiments, the training routine may generalize prompts that may be too specific. To obtain more general prompts, machine learning subsystem 116 may input into (large language model 106 or one of specialized language models 108*a*-108*n*) each set of prompts of a plurality of sets of prompts and one or more commands to generalize each prompt within the plurality of sets of prompts. For example, a specialized language model or a large language model may be trained to generalize questions. The training may use vector comparisons.

As a result of the training routine, the specialized language model may take as input a prompt (or a plurality of prompts corresponding sub-queries) in a form of a query/question and be able to identify the correct portion of the corpus. That is, the trained specialized language model may use the partitioned corpus to identify accurate answers to queries/questions. To identify accurate answers, the specialized language model may perform the following operations. For each received prompt (e.g., a sub-query), the specialized language model may generate a vector in the model's vector space and then compare (e.g., using cosine similarity or another suitable method) that vector with existing vectors corresponding to prompts that were used to train the specialized language model. If one or more matching vectors are identified, the specialized language model may determine a corresponding portion of the information corpus that corresponds to the matching vector. Accordingly, the portions of the information corpus that match the sub-queries become the accurate portions of a response to the query (e.g., the original user query).

Once all the prompts (e.g., sub-queries) are processed, machine learning subsystem 116 may receive the portions of the corpus of information responsive to the sub-queries. That is, machine learning subsystem 116 may receive from the specialized language model, a plurality of responses to the plurality of sub-queries. As discussed above, the specialized language model may match a corresponding vector of each sub-query with a vector of an output generated based on training data. That is, the specialized language model may be a machine learning model trained to output portions of a corpus of information responsive to a prompt.

In some embodiments, machine learning subsystem 116 may determine that additional data is available for generating a response. For example, a user or other automated system (e.g., web or internet or database query) may supply an additional file (e.g., text file, audio file, video file, or another suitable file) as part of the original query. Thus, machine learning subsystem 116 may take that data into account when generating responses to sub-queries. To process the additional data, machine learning subsystem 116 may determine additional data available for responding to the user query. That additional data is data that has not been used to train the specialized language model. For example, the user query may involve describing a particular meeting in view of a company's earnings for a particular quarter. Thus, the user query may include a transcript of the meeting (e.g., as a text file, an audio file, or another suitable file).

In response to determining availability of the additional data, machine learning subsystem 116 may generate one or more vectors of the additional data by vectorizing the additional data into the vector space of the specialized language model. Machine learning subsystem 116 may then provide the specialized language model with the vectorized additional data. For example, machine learning subsystem 116 may split the additional data (e.g., the received document or other data) into portions (e.g., using the same mechanism as the information corpus has been split). Machine learning subsystem 116 may then generate prompts/queries which the portions may answer (e.g., using the same mechanism as the prompts/questions are generated for the information corpus 104 described above). That is, machine learning subsystem 116 may generate an additional plurality of prompts to extract the additional data. The machine learning model may then train the machine learning model using the additional plurality of prompts and the vectorized additional data.

In some embodiments, machine learning subsystem 116 may vectorize the additional plurality of prompts into the vector space of the specialized language model. The vectorization process may generate additional vectors. For example, the additional vectors may correspond to portions of the additional data available as part of the query. Thus, during operation, the specialized language model may compare the additional vectors to the vectors associated with the sub-queries to determine which portions of the additional data should be part of the response to the user query. Once the additional prompts have been generated, the machine learning model may add the additional vectors and the additional data to the engineered prompt produced by the specialized language model. That is, during operation, when a vectorized prompt matches a sub-query, the specialized model may output the matching portion as a response to the sub-query.

In some embodiments, machine learning subsystem 116 may use the additional data without training the specialized language model on that data, but may use the additional data on the fly. In some embodiments, machine learning subsystem 116 may determine that additional data is available for generating a response. For example, a user may supply an additional file (e.g., text file, audio file, video file, or another suitable file) as part of the original query. Thus, machine learning subsystem 116 may take that data into account when generating responses to sub-queries. To process the additional data, machine learning subsystem 116 may determine additional data available for responding to the user query. That additional data is data that has not been used to train the specialized language model. For example, the user query may involve describing a particular meeting in view of a company's earnings for a particular quarter. Thus, the user query may include a transcript of the meeting (e.g., as a text file, an audio file, or another suitable file).

In response to determining availability of the additional data, machine learning subsystem 116 may split the additional data into additional portions. For example, machine learning subsystem 116 may (e.g., via data processing subsystem 114) use the same mechanism for splitting the additional data as was used for splitting the information corpus (e.g., as described above). Machine learning subsystem 116 may (e.g., via data processing subsystem 114) generate a corresponding set of prompts for each additional portion. For example, machine learning subsystem 116 may (e.g., via data processing subsystem 114) use the same mechanism for generating the prompts as was used for splitting the information corpus (e.g., as described above).

When the prompts are generated, machine learning subsystem 116 may (e.g., via data processing subsystem 114) generate an additional vector for each prompt in each corresponding set of prompts. For example, machine learning subsystem 116 may vectorize each prompt into the vector space of the specialized language model using the same mechanism as was used to vectorize the original prompts during training of the specialized language model.

Machine learning subsystem 116 may then indicate to the specialized language model to use each additional vector and each corresponding portion in generating responses to sub-queries. For example, machine learning subsystem 116 may generate a data structure to feed into the specialized learning model. FIG. 5 illustrates an excerpt of a data structure that stores vectors for additional prompts and corresponding portions. Fields 502 may store vectors for additional prompts while fields 504 may store corresponding portions of additional data. In some embodiments, fields 504 may store pointers to the portions in, for example, a database. Thus, the specialized language model may use the data structure when generating response to sub-queries. In some embodiments, the additional data may be used by the large language model instead of the specialized language model. For example, the additional data may be fed to the large language model to be used in combination with the responses to sub-queries received from the specialized language model.

Once all the responses to sub-queries have been received (e.g., from the specialized language model), machine learning subsystem 116 may generate an engineered prompt for a large language model. The engineered prompt may include a plurality of responses to the sub-queries and one or more instructions that instruct the large language model to generate a response based on the plurality of responses. For example, the engineered prompt may include instructions to use the sub-queries as the text of the full response. In addition, the prompt may include instructions for various options (e.g., type of tone to use) available for outputting the final response. Machine learning subsystem 116 may input the engineered prompt into the large language model to generate the response to the user query or an original query if the query did not come from a user.

When the response is received, machine learning subsystem 116 may pass the response to sentinel subsystem 118. Sentinel subsystem 118 may scan the response to identify any undesired text or other data within the response. That is, sentinel subsystem 118 may input the response into a sentinel machine learning model (e.g., sentinel model 110) to generate a modified response. The sentinel machine learning model may be trained to identify undesired components of the response. Undesired responses may be responses that are inaccurate, contain vulgar language, contain wrong or non-existing citations, and/or responses that do not conform to policy. To identify undesired responses, sentinel subsystem 118 may perform the following operations.

Sentinel subsystem 118 may split the response into a plurality of sub-responses. For example, sentinel subsystem

118 may split the response into phrases/sentences/paragraphs based on the form of the response. Each phrase/sentence/paragraph may be a sub-response.

Sentinel subsystem 118 may generate a corresponding input vector for each sub-response of the plurality of sub-responses. For example, sentinel subsystem 118 may vectorize each sub-response into the vector space of sentinel model 110. Sentinel model 110 may be trained with data containing undesired responses. For example, during training, sentinel model 110 may receive a plurality of phrases, sentences, and/or paragraphs that contain responses that are not desired. In some embodiments, sentinel model 110 may receive words that are not desired. The training routine may then generate vectors for those phrases, sentences, and/or paragraphs and uses those vectors, during operation, for comparison with vectors associated with an input. Alternatively or additionally, sentinel model 110 may be trained based on the information corpus to recognize phrases, sentences, paragraphs, and/or other suitable portions of a response that match what is found in the information corpus. Thus, sentinel model 110 may include two types of vector recognition. One type of vector recognition may recognize vectors that match things like vulgar terms, offensive content, and/or other content undesired by policy. A second type of vector recognition may recognize vectors that match vectors associated with an information corpus. The second type of vectors may be used to check for data accuracy within each sub-response.

Thus, machine learning subsystem 116 may input each vector into the sentinel machine learning model to determine whether each vector matches a trained vector within the sentinel machine learning model. For example, some or all vectors may match training vectors corresponding to data within the information corpus. When sentinel subsystem 118 determines that a vector corresponding to a sub-response matches a training vector associated with a portion of the information corpus, sentinel subsystem 118 may determine that a matching sub-response is valid. Sentinel subsystem 118 may perform this determination for each sub-response.

However, if a particular vector for a particular sub-response does not match a training vector found within the specialized language model, sentinel subsystem 118 may trigger a response. Thus, based on determining that a first input vector does not match any trained vector within the sentinel machine learning model, sentinel subsystem 118 may input a sub-response associated with the first input vector into the large language model with an instruction to perform error correction on a corresponding sub-response. The large language model may return a corrected sub-response. Once the corrected sub-response is returned, sentinel subsystem 118 may modify the response with the corrected sub-response. For example, sentinel subsystem 118 may replace the sub-response that is inaccurate with the modified sub-response. In some embodiments, sentinel subsystem 118 may repeat the error check for the modified sub-response before adding it to the full response. Sentinel subsystem 118 may then provide the modified response responsive to the user query. For example, sentinel subsystem 118 may generate the modified response for display on a user device.

Additionally, or alternatively, as described above, sentinel subsystem 118 may determine that one or more vectors for one or more sub-responses match one or more vectors for undesired response, and perform an action based on the determination. In particular, sentinel subsystem 118 may compare for each sub-response of the plurality of sub-responses the corresponding input vector with a plurality of training vectors such that each training vector corresponds to an undesired response. Based on determining that a second input vector matches a first vector of the plurality of training vectors, sentinel subsystem 118 may remove a corresponding sub-response from the response. For example, a particular sentence in a response may include a vulgar statement. Accordingly, sentinel subsystem 118 may remove that sentence from the response (e.g., remove the sub-response). In some embodiments, sentinel subsystem 118 may input the undesired sub-response into the large language model with a request to rephrase the sub-response without the vulgar or otherwise undesired language. The performance of the individual models such as 106, 108a-108n, 110 may be improved using reinforcement learning or other methods based on many instances of human feedback. The models may be trained using examples similar to actual cases where performance of the system was rated as poor.

Computing Device Components

Figure 6:
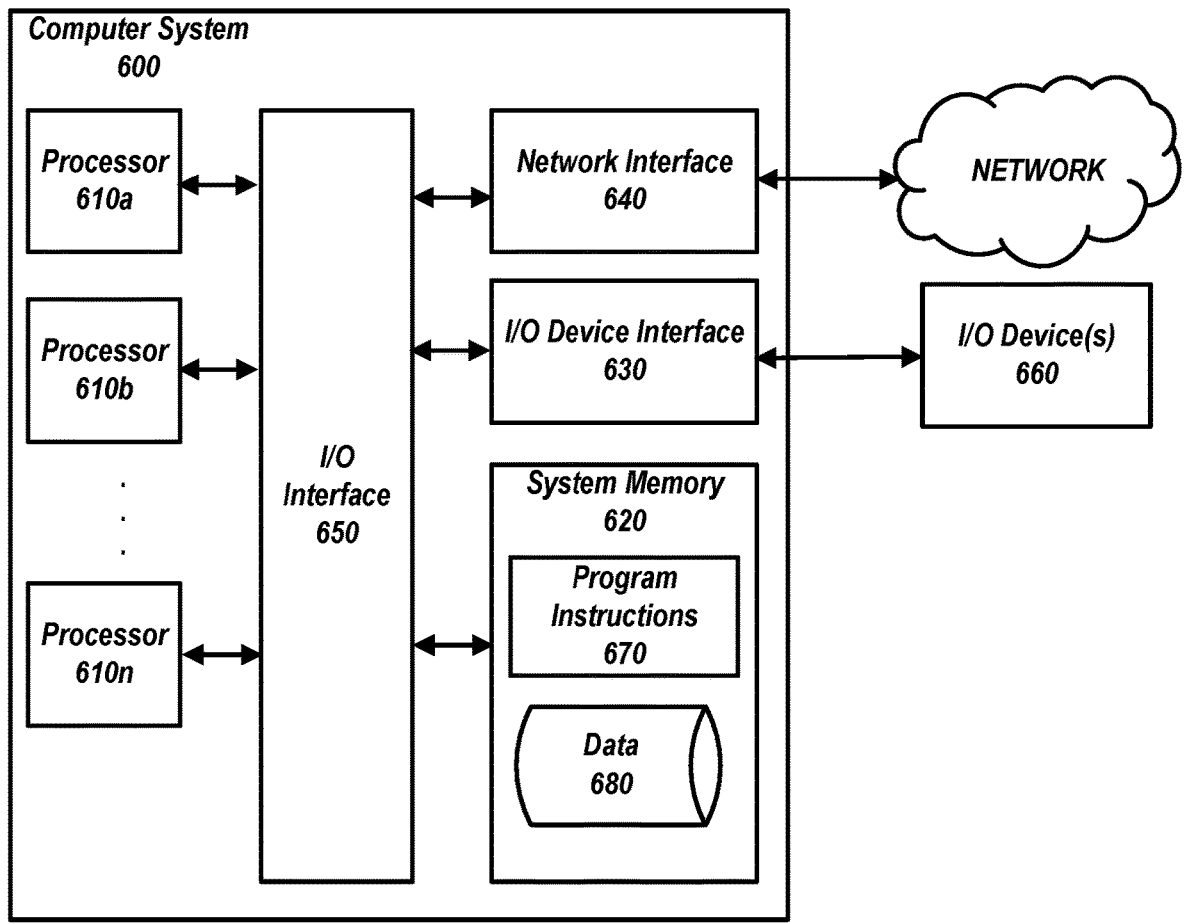
FIG. 6 shows an example computing system that may be used, in accordance with one or more embodiments of this disclosure.

FIG. 6 shows an example computing system that may be used in accordance with some embodiments of this disclosure. Specifically, hallucination prevention system 102, data node 104, devices hosting sentinel model 110, large language model 106, and/or specialized language models 108a-108n may use one or more of the components described below. In some instances, computing system 600 is referred to as a computer system. A person skilled in the art would understand that those terms may be used interchangeably. The components of FIG. 6 may be used to perform some or all operations and generate graphical user interfaces discussed in relation with FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610a-610n) coupled to system memory 620, an input/output I/O device interface 630, and a network interface 640 via an input/output (I/O) interface 650. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610a), or a multi-processor system including any number of suitable processors (e.g., 610a-610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network using network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610a-610n) to implement one or more embodiments of the present techniques. Program instructions 670 may include modules of computer program instructions for implementing one or more techniques described herein with regard to various processing modules. Program instructions 670 may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 620 may include a non-transitory computer readable storage medium that may have program instructions stored thereon that are executable by a computer processor (e.g., one or more of processors 610a-610n) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610a-610n, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600, or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 600 may also be connected to other devices that are not illustrated or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Computing Operation Flow

Figure 7:
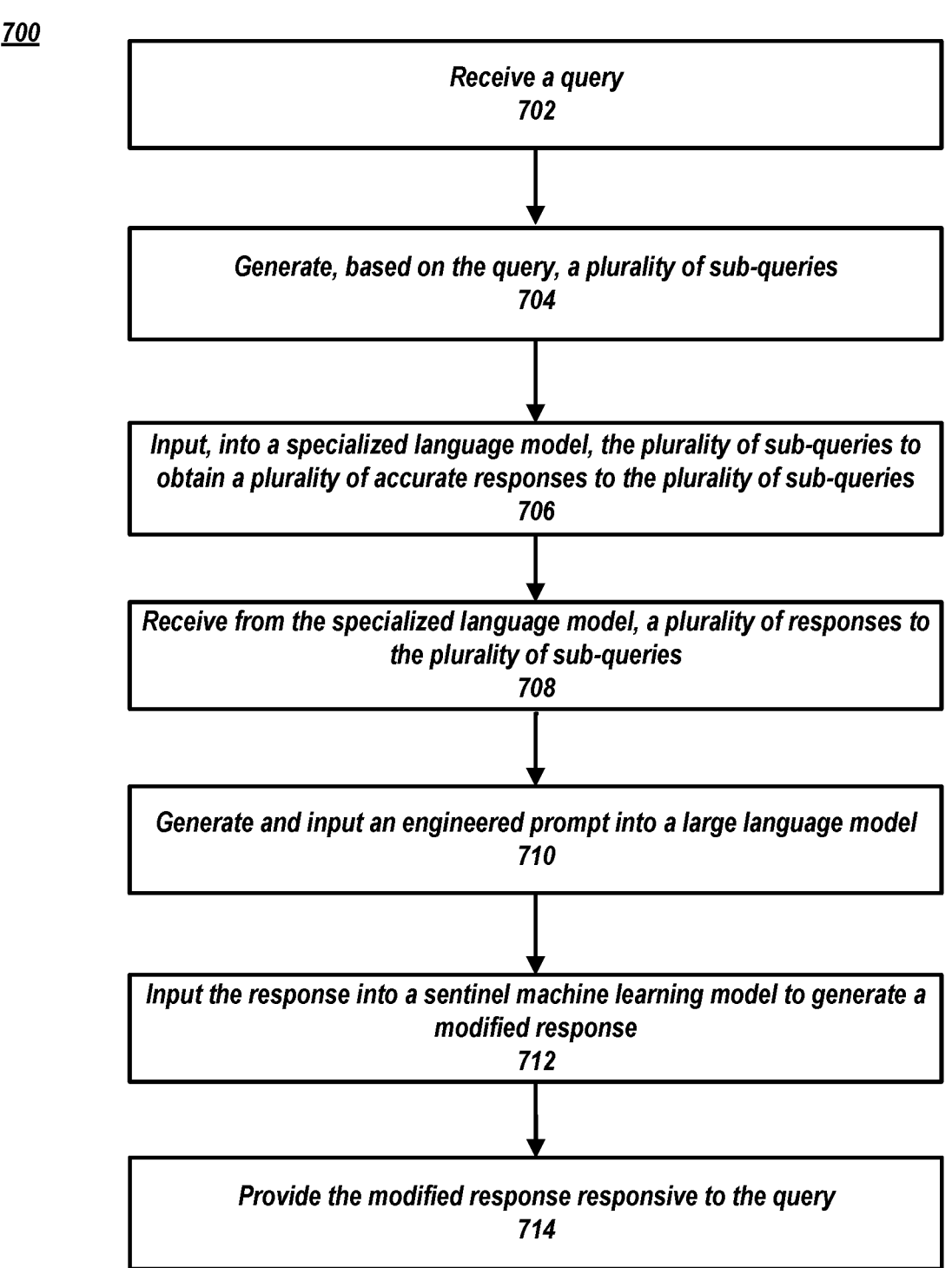
FIG. 7 is a flowchart of operations for a mechanism for preventing hallucinations in large language models, in accordance with one or more embodiments of this disclosure.

FIG. 7 illustrates a flowchart 700 of operations for a mechanism for preventing hallucinations in machine learning models. The operations of FIG. 7 may use components described in relation to FIG. 6 and may be performed on machine learning models described in FIG. 4. At 702, hallucination prevention system 102 receives a query. Hallucination prevention system 102 may receive the query via network interface 640 from a network (e.g., network 150).

At 704, hallucination prevention system 102 generates, based on the query, a plurality of sub-queries. Hallucination prevention system 102 may perform the operation using one or more processors 610a-610n. At 706, hallucination prevention system 102 inputs, into a specialized language model, the plurality of sub-queries to obtain a plurality of accurate responses to the plurality of sub-queries. Hallucination prevention system 102 may use one or more processors 610a-610n to perform this operation via one or more application programming interfaces available for interacting with the specialized language model.

At 708, hallucination prevention system 102 receives from the specialized language model, a plurality of responses to the plurality of sub-queries. Hallucination prevention system 102 may use one or more processors 610a-610n to perform this operation. The received responses may be stored in system memory 620 and or on data node 104 to be retrieved at a later time. Hallucination prevention system 102 may receive the responses via network interface 640 through network 150.

At 710, hallucination prevention system 102 generates and inputs an engineered prompt into a large language model. For example, hallucination prevention system 102 may use processors 610a-610n to perform this operation and store prompt in system memory 620. At 712, hallucination prevention system 102 inputs the response into a sentinel machine learning model to generate a modified response. Hallucination prevention system 102 may perform the input operation using an API. At 714, hallucination prevention system 102 provides the modified response responsive to the query. For example, hallucination prevention system 102 may use processors 610a-610n to generate a network package to be sent to a user using network interface 640 via network 150.

The techniques for preventing hallucinations in large language models will be better understood with reference to the following enumerated embodiments:

1. A method for removing hallucinations from machine learning models, the method comprising: receiving a query; generating, based on the query, a plurality of sub-queries; inputting, into a specialized language model, the plurality of sub-queries to obtain a plurality of accurate responses to the plurality of sub-queries, wherein the specialized language model is a machine learning model trained to output portions of a corpus of information responsive to a prompt; receiving from the specialized language model, a plurality of responses to the plurality of sub-queries; generating and input an engineered prompt into a large language model, wherein the engineered prompt comprises (1) the plurality of responses and (2) one or more instructions for the large language model, wherein the one or more instructions instruct the large language model to generate a response based on the plurality of responses; inputting the response into a sentinel machine learning model to generate a modified response, wherein the sentinel machine learning model is trained to identify undesired components of the response; and providing the modified response responsive to the query.

2. Any of the preceding embodiments, wherein generating, based on the query, the plurality of sub-queries further comprises: retrieving a exemplar query and a plurality of exemplar sub-queries; generating a large language model prompt comprising (1) text of the query, (2) the exemplar query with the plurality of exemplar sub-queries, and (3) a command to generate the plurality of sub-queries for the query, wherein the command comprises an indication that the exemplar query and the plurality of exemplar sub-queries are to be used as an example for outputting the plurality of sub-queries; inputting the prompt into the large language model; and receiving, from the large language model the plurality of sub-queries.

3. Any of the preceding embodiments, further comprising: receiving the corpus of information for training the specialized language model; splitting the corpus of information into a plurality of portions; inputting each portion of the plurality of portions into the large language model to obtain a corresponding set of prompts for each portion of the plurality of portions, wherein each portion of the plurality of portions is used to respond to the corresponding set of prompts; and training the specialized language model based on the plurality of portions and each corresponding set of prompts.

4. Any of the preceding embodiments, further comprising inputting into the large language model each set of prompts of a plurality of sets of prompts and one or more commands to generalize each prompt within the plurality of sets of prompts.

5. Any of the preceding embodiments, further comprising: determining additional data available for responding to the query, wherein the additional data has not been used to train the specialized language model; in response to determining availability of the additional data, splitting the additional data into additional portions; generating a corresponding set of additional prompts each additional portion; generating an additional vector for each prompt in each corresponding set of additional prompts; and indicating to the specialized language model to use each additional vector and each corresponding portion in generating responses to sub-queries.

6. Any of the preceding embodiments, wherein inputting the response into the sentinel machine learning model to generate the modified response further comprises: splitting the response into a plurality of sub-responses; generating a corresponding input vector for each sub-response of the plurality of sub-responses; inputting each vector into the sentinel machine learning model to determine whether each vector matches a trained vector within the sentinel machine learning model; and based on determining that a first input vector does not match any trained vector within the sentinel machine learning model, inputting a sub-response associated with the first input vector into the large language model with an instruction to perform error correction on a corresponding sub-response.

7. Any of the preceding embodiments, further comprising: comparing for each sub-response of the plurality of sub-responses the corresponding input vector with a plurality of training vectors, wherein each training vector corresponds to undesired response; and based on determining that a second input vector matches a first raining vector of the plurality of training vectors, removing the corresponding sub-response from the response.

8. Any of the proceeding embodiments, wherein the instructions further cause the one or more processors to: determine additional data available for responding to the user query, wherein the additional data has not been used to train the specialized language model; in response to determining availability of the additional data, generating one or more vectors of the additional data by vectorizing the additional data into the vector space of the specialized language model; generating an additional plurality of prompts for the additional data; vectorizing the additional plurality of prompts into the vector space of the specialized language model to generate additional vectors; and adding the additional vectors and the additional data to the specialized language model.

9. A tangible, non-transitory, machine-readable medium storing instructions that, when executed by a data processing apparatus, cause the data processing apparatus to perform operations comprising those of any of embodiments 1-8.

10. A system comprising: one or more processors; and memory storing instructions that, when executed by the processors, cause the processors to effectuate operations comprising those of any of embodiments 1-8.

11. A system comprising means for performing any of embodiments 1-8.

12. A system comprising cloud-based circuitry for performing any of embodiments 1-8.

Although the present invention has been described in detail for the purpose of illustration based on what is currently considered to be the most practical and preferred embodiments, it is to be understood that such detail is solely for that purpose, and that the invention is not limited to the disclosed embodiments, but on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A system for removing hallucinations from large language models, the system comprising:

one or more processors; and a non-transitory computer-readable storage medium storing instructions, which when executed by the one or more processors cause the one or more processors to:

receive a user query comprising a plurality of words;

generate, based on the user query, a plurality of sub-queries using a query building model, wherein each query of the plurality of sub-queries represents a component of the user query;

input, into a specialized language model, the plurality of sub-queries to obtain a plurality of accurate responses to the plurality of sub-queries, wherein each sub-query is mapped into a vector space of the specialized language model;

receive from the specialized language model, a plurality of responses to the plurality of sub-queries, wherein the specialized language model matches a corresponding vector of each sub-query with a vector of an output generated based on training data;

generate an engineered prompt for a large language model comprising (1) the plurality of responses and (2) one or more instructions for the large language model, wherein the one or more instructions instruct the large language model to generate a response based on the plurality of responses;

input the engineered prompt into the large language model to generate the response;

input the response into a sentinel machine learning model to generate a modified response, wherein the sentinel machine learning model is trained to identify undesired components of the response; and provide the modified response responsive to the user query.

2. The system of claim 1, wherein the instructions for generating, based on the user query, the plurality of sub-queries using the query building model further cause the one or more processors to:

generate a prompt for the query building model, wherein the prompt comprises text of the user query and an instruction to generate component queries for the user query;

input the prompt into the query building model; and receive, from the query building model the plurality of sub-queries.

3. The system of claim 2, wherein the instructions further cause the one or more processors to:

receive an exemplar query and a plurality of exemplar sub-queries; and submit the exemplar query and the plurality of exemplar sub-queries into the query building model with an indication that the exemplar query and the plurality of exemplar sub-queries to be used as an example for outputting the plurality of sub-queries.

4. The system of claim 1, wherein the instructions further cause the one or more processors to:

receive a corpus of information for training a machine learning model;

split the corpus of information into a plurality of portions;

input each portion of the plurality of portions into the large language model to obtain a corresponding set of prompts for each portion of the plurality of portions, wherein each portion of the plurality of portions is used to respond to the corresponding set of prompts; and train the specialized language model based on the plurality of portions and each corresponding set of prompts.

5. The system of claim 4, wherein the instructions further cause the one or more processors to input into the large language model each set of prompts of a plurality of sets of prompts and one or more commands to generalize each prompt within the plurality of sets of prompts.

6. The system of claim 1, wherein the instructions further cause the one or more processors to:

determine additional data available for responding to the user query, wherein the additional data has not been used to train the specialized language model;

in response to determining availability of the additional data, generating one or more vectors of the additional data by vectorizing the additional data into the vector space of the specialized language model;

generating an additional plurality of prompts for the additional data;

vectorizing the additional plurality of prompts into the vector space of the specialized language model to generate additional vectors; and adding the additional vectors and the additional data to the specialized language model.

7. The system of claim 1, wherein the instructions, for inputting the response into the sentinel machine learning model to generate the modified response further cause the one or more processors to:

split the response into a plurality of sub-responses;

generate a corresponding input vector for each sub-response of the plurality of sub-responses;

input each vector into the sentinel machine learning model to determine whether each vector matches a trained vector within the sentinel machine learning model; and based on determining that a first input vector does not match any trained vector within the sentinel machine learning model, input a sub-response associated with the first input vector into the large language model with an instruction to perform error correction on a corresponding sub-response.

8. The system of claim 7, wherein the instructions further cause the one or more processors to:

compare for each sub-response of the plurality of sub-responses the corresponding input vector with a plurality of training vectors, wherein each training vector corresponds to undesired response; and based on determining that a second input vector matches a first raining vector of the plurality of training vectors, remove the corresponding sub-response from the response.

9. A method for removing hallucinations from machine learning models, the method comprising:

receiving a query;

generating, based on the query, a plurality of sub-queries;

inputting, into a specialized language model, the plurality of sub-queries to obtain a plurality of accurate responses to the plurality of sub-queries, wherein the specialized language model is a machine learning model trained to output portions of a corpus of information responsive to a prompt;

receiving from the specialized language model, a plurality of responses to the plurality of sub-queries;

generating and input an engineered prompt into a large language model, wherein the engineered prompt comprises (1) the plurality of responses and (2) one or more instructions for the large language model, wherein the one or more instructions instruct the large language model to generate a response based on the plurality of responses;

inputting the response into a sentinel machine learning model to generate a modified response, wherein the sentinel machine learning model is trained to identify undesired components of the response; and providing the modified response responsive to the query.

10. The method of claim 9, wherein generating, based on the query, the plurality of sub-queries further comprises:

retrieving an exemplar query and a plurality of exemplar sub-queries;

generating a large language model prompt comprising (1) text of the query, (2) the exemplar query with the plurality of exemplar sub-queries, and (3) a command to generate the plurality of sub-queries for the query, wherein the command comprises an indication that the exemplar query and the plurality of exemplar sub-queries are to be used as an example for outputting the plurality of sub-queries;

inputting the prompt into the large language model; and receiving, from the large language model the plurality of sub-queries.

11. The method of claim 9, further comprising:

receiving the corpus of information for training the specialized language model;

splitting the corpus of information into a plurality of portions;

inputting each portion of the plurality of portions into the large language model to obtain a corresponding set of prompts for each portion of the plurality of portions, wherein each portion of the plurality of portions is used to respond to the corresponding set of prompts; and training the specialized language model based on the plurality of portions and each corresponding set of prompts.

12. The method of claim 11, further comprising inputting into the large language model each set of prompts of a plurality of sets of prompts and one or more commands to generalize each prompt within the plurality of sets of prompts.

13. The method of claim 12, further comprising:

determining additional data available for responding to the query, wherein the additional data has not been used to train the specialized language model;

in response to determining availability of the additional data, splitting the additional data into additional portions;

generating a corresponding set of additional prompts each additional portion;

generating an additional vector for each prompt in each corresponding set of additional prompts; and indicating to the specialized language model to use each additional vector and each corresponding portion in generating responses to sub-queries.

14. The method of claim 9, wherein inputting the response into the sentinel machine learning model to generate the modified response further comprises:

splitting the response into a plurality of sub-responses;

generating a corresponding input vector for each sub-response of the plurality of sub-responses;

inputting each vector into the sentinel machine learning model to determine whether each vector matches a trained vector within the sentinel machine learning model; and based on determining that a first input vector does not match any trained vector within the sentinel machine learning model, inputting a sub-response associated with the first input vector into the large language model with an instruction to perform error correction on a corresponding sub-response.

15. The method of claim 14, further comprising:

comparing for each sub-response of the plurality of sub-responses the corresponding input vector with a plurality of training vectors, wherein each training vector corresponds to undesired response; and based on determining that a second input vector matches a first raining vector of the plurality of training vectors, removing the corresponding sub-response from the response.

16. A non-transitory, computer-readable medium storing instructions that when executed by one or more processors cause the one or more processors to perform operations comprising:

receiving a query;

generating, based on the query, a plurality of sub-queries;

inputting, into a specialized language model, the plurality of sub-queries to obtain a plurality of accurate responses to the plurality of sub-queries, wherein the specialized language model is a machine learning model trained to output portions of a corpus of information responsive to a prompt;

receiving from the specialized language model, a plurality of responses to the plurality of sub-queries;

generating and input an engineered prompt into a large language model, wherein the engineered prompt comprises (1) the plurality of responses and (2) one or more instructions for the large language model, wherein the one or more instructions instruct the large language model to generate a response based on the plurality of responses;

inputting the response into a sentinel machine learning model to generate a modified response, wherein the sentinel machine learning model is trained to identify undesired components of the response; and providing the modified response responsive to the query.

17. The non-transitory, computer-readable medium of claim 16, wherein the instructions for generating, based on the query, the plurality of sub-queries further cause the one or more processors to perform operations comprising:

retrieving a exemplar query and a plurality of exemplar sub-queries;

generating a large language model prompt comprising (1) text of the query, (2) the exemplar query with the plurality of exemplar sub-queries, and (3) a command to generate the plurality of sub-queries for the query, wherein the command comprises an indication that the exemplar query and the plurality of exemplar sub-queries are to be used as an example for outputting the plurality of sub-queries;

inputting the prompt into the large language model; and receiving, from the large language model the plurality of sub-queries.

18. The non-transitory, computer-readable medium of claim 16, wherein the instructions further cause the one or more processors to perform operations comprising:

receiving the corpus of information for training the specialized language model;

splitting the corpus of information into a plurality of portions;

inputting each portion of the plurality of portions into the large language model to obtain a corresponding set of prompts for each portion of the plurality of portions, wherein each portion of the plurality of portions is used to respond to the corresponding set of prompts; and training the specialized language model based on the plurality of portions and each corresponding set of prompts.

19. The non-transitory, computer-readable medium of claim 18, wherein the instructions further cause the one or more processors to input into the large language model each set of prompts of a plurality of sets of prompts and one or more commands to generalize each prompt within the plurality of sets of prompts.

20. The non-transitory, computer-readable medium of claim 19, wherein the instructions further cause the one or more processors to perform operations comprising:

determining additional data available for responding to the query, wherein the additional data has not been used to train the specialized language model;

in response to determining availability of the additional data, splitting the additional data into additional portions;

generating a corresponding set of additional prompts each additional portion;

generating an additional vector for each prompt in each corresponding set of additional prompts; and indicating to the specialized language model to use each additional vector and each corresponding portion in generating responses to sub-queries.

* * * * *